United States Patent
Lee et al.

(10) Patent No.: US 12,433,530 B2
(45) Date of Patent: Oct. 7, 2025

(54) VOICE CHARACTERISTIC-BASED METHOD AND DEVICE FOR PREDICTING ALZHEIMER'S DISEASE

(71) Applicant: EMOCOG CO., LTD., Seoul (KR)

(72) Inventors: Jun-Young Lee, Seoul (KR); Hyunwoong Ko, Seoul (KR)

(73) Assignee: EMOCOG CO., LTD., Seoul (KR)

( * ) Notice: Subject to any disclaimer, the term of this patent is extended or adjusted under 35 U.S.C. 154(b) by 396 days.

(21) Appl. No.: 18/004,934

(22) PCT Filed: Jul. 8, 2021

(86) PCT No.: PCT/KR2021/008710
§ 371 (c)(1),
(2) Date: Jan. 10, 2023

(87) PCT Pub. No.: WO2022/010282
PCT Pub. Date: Jan. 13, 2022

(65) Prior Publication Data
US 2023/0233136 A1 Jul. 27, 2023

(30) Foreign Application Priority Data

Jul. 10, 2020 (KR) .......... 10-2020-0085449
Jul. 7, 2021 (KR) .......... 10-2021-0089014

(51) Int. Cl.
*A61B 5/00* (2006.01)
*G10L 25/66* (2013.01)

(52) U.S. Cl.
CPC .......... *A61B 5/4088* (2013.01); *A61B 5/7275* (2013.01); *G10L 25/66* (2013.01)

(58) Field of Classification Search
CPC . A61B 5/4088; A61B 5/7275; A61B 2503/08; A61B 5/749; A61B 5/4064;
(Continued)

(56) References Cited

U.S. PATENT DOCUMENTS

2017/0053665 A1* 2/2017 Quatieri, Jr. ........... G16H 50/70
2018/0322961 A1 11/2018 Kim et al.
(Continued)

FOREIGN PATENT DOCUMENTS

JP 2007-532219 A 11/2007
JP 2013-255786 A 12/2013
(Continued)

OTHER PUBLICATIONS

International Search Report of PCT/KR2021/008710 dated Oct. 25, 2021 [PCT/ISA/210].

*Primary Examiner* — Scott M. Getzow
(74) *Attorney, Agent, or Firm* — Sughrue Mion, PLLC

(57) ABSTRACT

A method and device for predicting Alzheimer's disease based on voice characteristics are provided. The device for predicting Alzheimer's disease according to an embodiment includes: a voice input unit configured to generate a voice sample by recording a voice of a subject; a data input unit configured to receive demographic information of the subject; a voice characteristic extraction unit configured to extract voice characteristics from the generated voice sample; and a prediction model that is pre-trained to predict presence or absence of Alzheimer's disease in the subject, based on the voice characteristics and the demographic information.

8 Claims, 4 Drawing Sheets

(58) Field of Classification Search
CPC ..... A61B 5/4803; A61B 5/7267; G10L 25/66; G16H 10/20
See application file for complete search history.

(56) References Cited

U.S. PATENT DOCUMENTS

| | | |
|---|---|---|
| 2019/0043618 A1 | 2/2019 | Vaughan et al. |
| 2019/0311815 A1 | 10/2019 | Kim et al. |
| 2020/0027557 A1 | 1/2020 | Karow et al. |

FOREIGN PATENT DOCUMENTS

| | | |
|---|---|---|
| JP | 2017-46659 A | 3/2017 |
| JP | 2019-084249 A | 6/2019 |
| JP | 2020-64051 A | 4/2020 |
| KR | 10-2012-0070668 A | 7/2012 |
| KR | 10-2014-0119486 A | 10/2014 |
| KR | 10-1881731 B1 | 7/2018 |
| KR | 10-2019-0063275 A | 6/2019 |
| KR | 10-2019-0081626 A | 7/2019 |
| KR | 10-2020-0073156 A | 6/2020 |
| WO | 2018/204934 A1 | 11/2018 |
| WO | 2019/086555 A1 | 5/2019 |
| WO | 2019/221252 A1 | 11/2019 |

\* cited by examiner

VOICE CHARACTERISTIC-BASED METHOD AND DEVICE FOR PREDICTING ALZHEIMER'S DISEASE

CROSS REFERENCE TO RELATED APPLICATIONS

This application is a National Stage of International Application No. PCT/KR2021/008710 filed on Jul. 8, 2021, claiming priority based on Korean Patent Application No. 10-2020-0085449 filed on Jul. 10, 2020 and Korean Patent Application No. 10-2021-0089014 filed on Jul. 7, 2021.

TECHNICAL FIELD

The present disclosure relates to a method of diagnosing Alzheimer's disease (AD), which accounts for the highest percentage among the causes of dementia, by helping a medical practitioner to determine the presence or absence of Alzheimer's disease through a non-invasive method using a voice of a patient, and is to provide a method and device for predicting a state of dementia due to Alzheimer's disease by performing a non-invasive method on individuals at high risk of dementia.

BACKGROUND ART

Along with the fourth industry, the use of artificial intelligence (AI) speakers is gradually increasing, but they have not yet been popularized. There are various reasons for the delay in popularization of AI speakers, but the majority of consumers are of the opinion that there is not enough content to utilize AI speakers. That is, the development of a variety of content using AI speakers is required.

Currently, the combination of AI speakers and the healthcare industry is recognized as an opportunity to achieve both profitability and the public interest, and many domestic and foreign researchers are developing a variety of healthcare-related content by using AI speakers.

The elderly population aged 65 or older in South Korea accounted for 7.1% of the total population as of 2000, and is expected to exceed 20% by 2026. As of 2000, the number of patients with dementia, which is a representative geriatric disease, was 280,000, or 8.3% of the elderly aged 65 or older, and it is still increasing as it is estimated to reach 430,000, or 8.6% of the total elderly population in 2010. The prevalence of dementia shows a steady increase due to the increase in the life expectancy along with the increase in the elderly population.

Alzheimer's disease (AD) is the most common cause of dementia, accounting for about 70% of all cases of dementia, and it is estimated that there will be about 600,000 patients with AD by 2020. AD that is a representative degenerative dementia disease is a devastating disease that causes a deterioration in the cognitive function and difficulties in daily lives due to the degeneration of cerebral nerve cells, and leads to death, causing pain not only to the patient but also to the family caring for the patient. Because AD is an irreversible disease and no cure has been developed, early diagnosis and rapid intervention are currently the best courses of action. The rising prevalence of AD is also having a huge impact on public health and medical spending.

Speech and language disorders are symptoms accompanying dementia due to cognitive function deterioration and neurodegeneration, are frequently used as criteria for distinguishing between normal aging and diseases that cause dementia, and often appear as markers of early symptoms. Therefore, in automatic speech recognition research, various studies are being conducted to discover speech and language markers for dementia diagnosis. Among them, studies for predicting dementia by using DementiaBank's Pitt corpus data (e.g., explanation of Cookie Theft photo) are the main focus.

Considering that cerebrospinal fluid examination or positron emission tomography (PET), which are used to accurately diagnose AD that is a representative dementia-causing disease, is limited to a particular space and time with an expert, there is a demand for a method and device for predicting, by using an AI speaker and a smart device, whether a participant in a conversation is suffering from AD.

DISCLOSURE

Technical Problem

The present disclosure relates to a method of diagnosing Alzheimer's disease by using acoustic characteristics of a voice, and relates to a method and device for predicting the presence or absence and possibility of Alzheimer's disease in a participant in a conversation by collecting, through a voice recognition microphone, responses of the participant by using an artificial intelligence (AI) speaker or a smart device.

Technical Solution

According to an embodiment of the present disclosure, a device for predicting Alzheimer's disease based on voice characteristics includes: a voice input unit configured to generate a voice sample by recording a voice of a subject; a data input unit configured to receive demographic information of the subject; a voice characteristic extraction unit configured to extract voice characteristics from the generated voice sample; and a prediction model that is pre-trained to predict presence or absence of Alzheimer's disease in the subject, based on the voice characteristics and the demographic information.

According to an embodiment of the present disclosure, a method of predicting Alzheimer's disease based on voice characteristics includes: generating a voice sample by recording a voice of a subject; receiving demographic information of the subject; extracting voice characteristics from the generated voice sample; and predicting presence or absence of Alzheimer's disease in the subject by inputting the voice characteristics and the demographic information into a pre-trained prediction model.

According to an embodiment of the present disclosure, in a computer-readable recording medium having recorded thereon computer-readable instructions, the computer-readable instructions, when executed by at least one processor, cause the at least one processor to: generate a voice sample by recording a voice of a subject; receive demographic information of the subject; extract voice characteristics from the generated voice sample; and predict presence or absence of Alzheimer's disease in the subject by inputting the voice characteristics and the demographic information into a pre-trained prediction model.

Advantageous Effects

According to an embodiment of the present disclosure, a method and device for predicting the presence or absence of Alzheimer's disease in a participant in a conversation, based on voice characteristics by using an artificial intelligence (AI) speaker and a smart device is expected to help overcome the temporal, spatial, and resource limitations associated with existing tests, and may support medical personnel in diagnosing Alzheimer's disease.

Through the prediction of the risk of Alzheimer's disease using the acoustic characteristics of a voice provided by the present disclosure, it is possible to support the preparation of appropriate intervention plans for the continuously increasing population with dementia.

MODE FOR INVENTION

Figure 1:
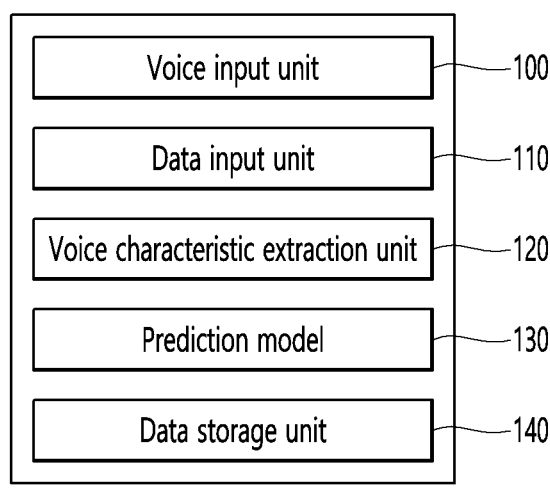
FIG. 1 is a block diagram illustrating a configuration of a device for predicting Alzheimer's disease based on voice characteristics, according to an embodiment of the present disclosure.

Hereinafter, preferred embodiments of the present disclosure will be described with reference to the accompanying drawings. The present disclosure will be described with reference to embodiments illustrated in the drawings, but the embodiments are merely examples, and the technical spirit of the present disclosure and its core configuration and operation are not limited to the embodiments.

Figure 2:
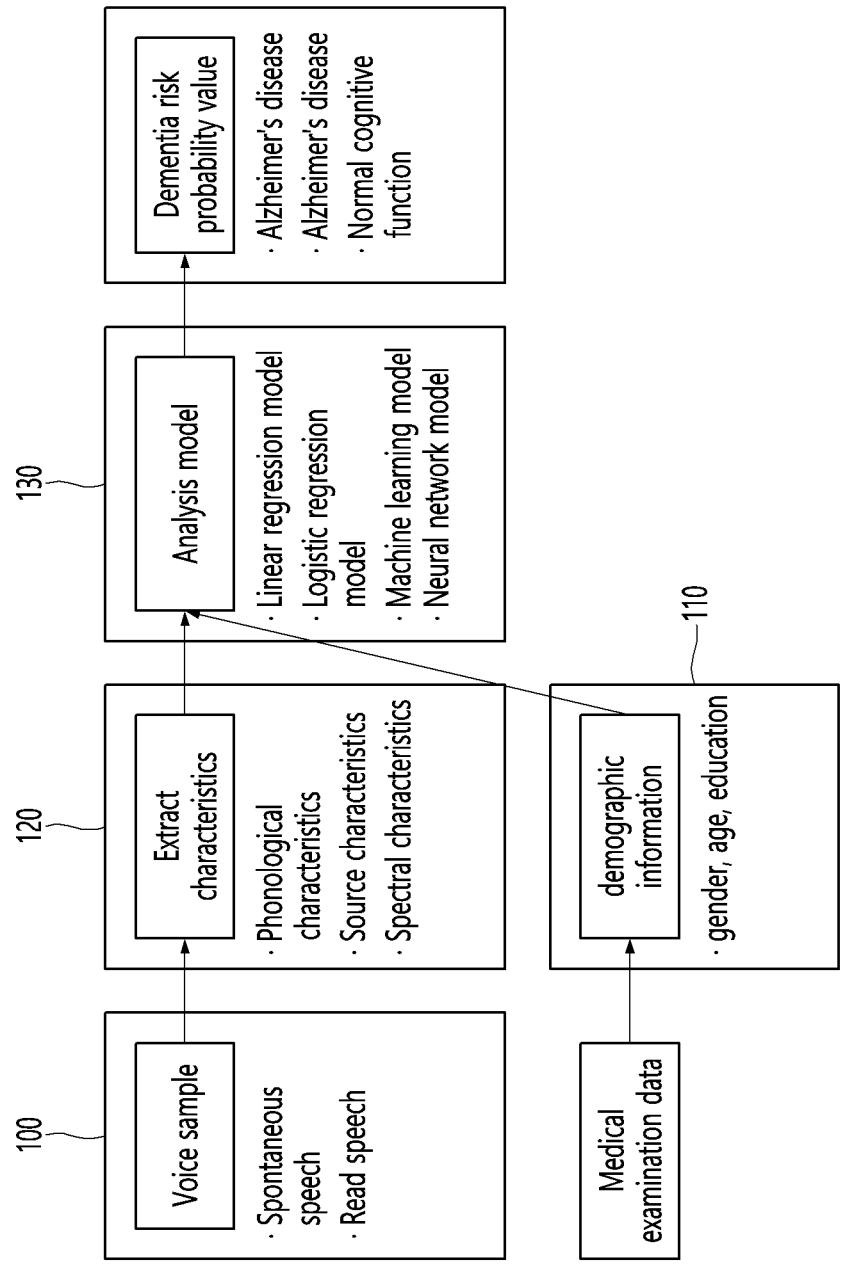
FIG. 2 is a diagram illustrating an example of an operation process of a device for predicting Alzheimer's disease based on voice characteristics, according to an embodiment of the present disclosure.

FIG. 1 is a block diagram illustrating a configuration of a device for predicting Alzheimer's disease, according to an embodiment of the present disclosure. FIG. 2 is a diagram illustrating an example of an operation process of a device for predicting Alzheimer's disease, according to an embodiment of the present disclosure.

Referring to FIGS. 1 and 2, a device 10 for predicting Alzheimer's disease according to an embodiment of the present disclosure includes a voice input unit 100, a data input unit 110, a voice characteristic extraction unit 120, a prediction model 130, and a data storage unit 140.

The device 10 for predicting Alzheimer's disease may have aspects that are entirely hardware, or partly hardware and partly software. For example, in the present specification, the device 10 for predicting Alzheimer's disease and each unit included therein may collectively refer to a device for exchanging data that is in a particular format and contains particular content, in an electronic communication manner, and software related thereto. In the present specification, terms such as "unit", "module", "server", "device", "apparatus", or "terminal" refer to a combination of hardware and software executed by the hardware. For example, the hardware may be a data processing device including a central processing unit (CPU) or other processors. Also, the software executed by the hardware may refer to a running process, an object, an executable file, a thread of execution, a program, and the like.

In addition, the respective modules constituting the device 10 for predicting Alzheimer's disease are not necessarily intended to refer to separate, physically distinct components. Although FIG. 1 illustrates that the voice input unit 100, the data input unit 110, the voice characteristic extraction unit 120, the prediction model 130, and the data storage unit 140 are separate blocks that are physically distinct from each other, this is only for functionally distinguishing the devices constituting the device 10 for predicting Alzheimer's disease according to the operations performed by the devices. Accordingly, in some embodiments, some or all of the voice input unit 100, the data input unit 110, the voice characteristic extraction unit 120, the prediction model 130, and the data storage unit 140 may be integrated into one device. For example, the device 10 for predicting Alzheimer's disease may be implemented with a device capable of speech recognition and data processing, such as an artificial intelligence (AI) speaker. However, the present disclosure is not limited thereto, and one or more of the above-described components may be implemented as separate devices that are physically distinguished from other units, or may be components communicatively connected to each other in a distributed computing environment.

The voice input unit 100 generates a voice sample of a subject. The voice input unit 100 may be configured to generate a voice sample by recording a voice of the subject, at a preset frequency. The voice input unit 100 may include a condenser microphone and a device for controlling the condenser microphone, and may generate a voice sample by recording a voice of the subject, at a frequency of 16 Hz or greater. The subject performs, in a quiet room in which sound recording is possible, at least one of verbal description of picture, oral reading of a standard passage, and story recalling, to perform spontaneous speech or read speech, and the voice input unit 100 records the speech of the subject to generate a voice sample.

The data input unit 110 receives demographic information of the subject. The demographic information includes at least the age, gender, and years of education (i.e., the level of education completed) of the subject. Data input through the data input unit 110 refers to data from which the age, gender, and years of education of the subject may be identified, or from which such information may be extracted. For example, the demographic information may be obtained from medical examination data of the subject. The medical examination data may include information related to a patient's age, gender, and years of education, corresponds to data generated by using a medical opinion of a trained medical specialist, and may be data collected under management by other medical staff and the patient's guardian. The data input unit 110 may receive the demographic information through the above-described medical examination data, but is not limited thereto. In some embodiments, the demographic information of the subject may be directly input by the subject.

Data input through the voice input unit 100 and the data input unit 110 may be stored in the data storage unit 140. The data storage unit 140 may be configured to store input data or to provide a temporary storage space required for a prediction model to be described below to perform data processing.

The voice characteristic extraction unit 120 may extract voice characteristics of the patient, from the input voice sample of the subject. The voice characteristic extraction unit 120 may extract voice characteristics related to phonological characteristics, source characteristics, and spectral characteristics of the voice sample. In detail, the voice characteristic extraction unit 120 may extract, as the voice characteristics, at least one of fundamental frequency, speech-related information (e.g., speech rate, speech time, speech length), pause-related information (e.g., pause degree, number of pauses, pause interval length), shimmer, jitter, formant, harmonic-to-noise ratio, loudness, spectral centroid, Mel-frequency cepstral coefficients (MFCCs), identity vector (i-vector), articulation rate, zero-crossing rate (ZCR), voicing probability (VP), line spectral pairs (LSP), period perturbation, amplitude perturbation quotient (APQ), stiffness, energy, intensity (volume), and entropy of the voice of the subject.

Here, the voice characteristic extraction unit 120 may first perform preprocessing for quantifying the voice sample. Through the preprocessing, the time and frequency of the voice sample may be adjusted to be constant. In addition, human voices and non-human voices may be distinguished through the preprocessing. The voice characteristic extraction unit 120 may include an artificial neural network model (e.g., a convolutional neural network) trained to select only human voices from a voice sample input thereto, and may perform preprocessing to select only human voices described above through the trained artificial neural network model. The voice characteristic extraction unit 120 may extract, from a preprocessed voice, voice characteristics including at least one of fundamental frequency, speech rate, speech time, speech length, pause degree, number of pauses, pause interval length, shimmer, jitter, formant, harmonic-to-noise ratio, loudness, spectral centroid, MFCCs, i-vector, articulation rate, ZCR, VP, LSP, period perturbation, APQ, stiffness, energy, intensity (volume), and entropy of a voice. The voice characteristic extraction unit 120 may also extract voice characteristics corresponding to phonemes, sources, and spectral domains by using an open voice characteristic extraction program (e.g., Praat).

The prediction model 130 may be pre-trained to predict the presence or absence of Alzheimer's disease in the subject, based on the voice characteristics extracted by the voice characteristic extraction unit 120 and the demographic information provided through the data input unit 110. The prediction model 130 may include at least one analysis model among a linear regression model, a logistic regression model, a machine learning model, and a neural network model.

The prediction model 130 may include a multivariate logistic regression model, and the multivariate logistic regression model may be configured based on Equation 1 below.

$$\log\left(\frac{p(X)}{1-p(X)}\right) = \beta_0 + \beta_1 X_1 + \beta_2 X_2 + \beta_3 X_3 + \ldots + \beta_p X_p \quad \text{[Equation 1]}$$

(Here, $X_1$ to $X_p$ are independent variables that are input values input to the prediction model and correspond to p voice characteristics and pieces of demographic information, respectively, $\beta_1$ to $\beta_p$ correspond to constant values that are regression coefficients of the independent variables, $\beta_0$ corresponds to an initial constant value, and p(X) corresponds to a dementia risk probability value)

The prediction model 130 configured based on Equation 1 may output a dementia risk probability value and output state information obtained by evaluating a condition of the patient based on the dementia risk probability value. The dementia risk probability value refers to the probability of being diagnosed with dementia, the state information is a diagnosis of the patient according to a diagnosis criterion of a specialist, and the state of the patient may be determined as Alzheimer's disease or normal cognitive function. For example, the prediction model 130 may determine the state of the patient as Alzheimer's disease in a case in which the calculated dementia risk probability value p(X) is 0.5 or greater, and determine the state of the patient as normal cognitive function in a case in which the calculated dementia risk probability value is less than 0.5.

However, the prediction model 130 of the present disclosure is not limited thereto. The prediction model 130 may be configured as a multivariate logistic regression model, and may determine the state of the patient as one of Alzheimer's disease, mild cognitive impairment, and normal cognitive function, based on the calculated dementia risk probability values.

Hereinafter, a method of predicting Alzheimer's disease based on voice characteristics according to another embodiment of the present disclosure will be described.

Figure 3:
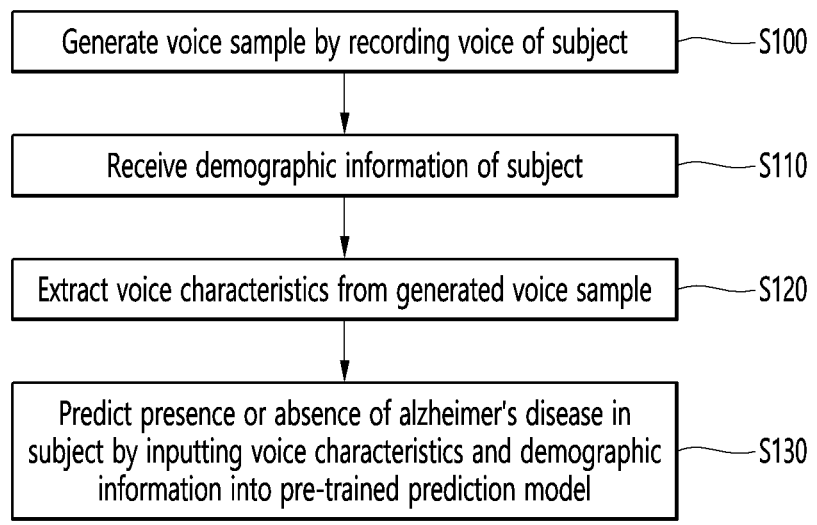
FIG. 3 is a block diagram illustrating a sequence of a method of predicting Alzheimer's disease based on voice characteristics, according to an embodiment of the present disclosure.

FIG. 3 is a flowchart of a method of predicting Alzheimer's disease based on voice characteristics, according to an embodiment. The method may be performed by the device for predicting Alzheimer's disease of FIGS. 1 and 2, and reference may be made to FIGS. 1 and 2 and the related descriptions for describing of the present embodiment.

Referring to FIG. 3, the method of predicting Alzheimer's disease based on voice characteristics according to an embodiment includes: generating a voice sample by recording a voice of a subject (S100); receiving demographic information of the subject (S110); extracting voice characteristics from the generated voice sample (S120); and predicting the presence or absence of Alzheimer's disease in the subject by inputting the voice characteristics and the demographic information into a pre-trained prediction model (S130).

Operations S100 and S110 of the method of predicting Alzheimer's disease based on voice characteristics according to an embodiment are sequentially illustrated and described for convenience of description, and are not limited to the described order to be sequentially performed. In some embodiments, operation S110 may be performed before operation S100. In addition, training the prediction model may be performed first before the method is performed.

The voice sample is generated by recording the voice of the subject (S100).

The subject performs, in a quiet room in which sound recording is possible, at least one of verbal description of picture, oral reading of a standard passage, and story recalling, to perform spontaneous speech or read speech, and the voice sample is generated by recording the speech of the subject. The voice input unit 100 may include a condenser microphone and a device for controlling the condenser microphone, and may generate a voice sample by recording a voice of the subject, at a frequency of 16 Hz or greater.

The demographic information of the subject is received (S110).

The demographic information includes the age, gender, and years of education of the subject. For example, the demographic information may be obtained from medical examination data of the subject. The medical examination data may include information related to a patient's age, gender, and years of education, corresponds to data generated by using a medical opinion of a trained medical specialist, and may be data collected under management by other medical staff and the patient's guardian. The data input unit 110 may receive the demographic information through the above-described medical examination data, but is not limited thereto. In some embodiments, the demographic information of the subject may be directly input by the subject.

Next, the voice characteristics are extracted from the generated voice sample (S120).

The voice characteristics of the patient may be extracted from the input voice sample of the subject. An artificial neural network model may be used for preprocessing to quantify the voice sample of the patient. Through the preprocessing, the time and frequency of the voice sample may be adjusted to be constant. In addition, in a case in which there are a plurality of input voice samples, preprocessing for selecting a voice sample may be performed. The voice characteristic extraction unit 120 may extract, from a preprocessed voice, voice characteristics including at least one of fundamental frequency, speech rate, speech time, speech length, pause degree, number of pauses, pause interval length, shimmer, jitter, formant, harmonic-to-noise ratio, loudness, spectral centroid, MFCCs, i-vector, articulation rate, ZCR, VP, LSP, period perturbation, APQ, stiffness, energy, intensity (volume), and entropy of a voice.

Next, the presence or absence of Alzheimer's disease in the subject is predicted by inputting the voice characteristics and the demographic information into the pre-trained prediction model (S130).

The prediction model 130 may be pre-trained to predict the presence or absence of Alzheimer's disease in the subject, based on the voice characteristics extracted by the voice characteristic extraction unit 120 and the demographic information provided through the data input unit 110. The prediction model 130 may include at least one analysis model among a linear regression model, a logistic regression model, a machine learning model, and a neural network model.

The prediction model 130 may include a multivariate logistic regression model, and the multivariate logistic regression model may be configured based on Equation 1 below.

$$\log\left(\frac{p(X)}{1-p(X)}\right) = \beta_0 + \beta_1 X_1 + \beta_2 X_2 + \beta_3 X_3 + \ldots + \beta_p X_p \quad \text{[Equation 1]}$$

(Here, $X_1$ to $X_p$ are independent variables that are input values input to the prediction model and correspond to p voice characteristics and pieces of demographic information, respectively, $\beta_1$ to $\beta_p$ correspond to constant values that are regression coefficients of the independent variables, $\beta_0$ corresponds to an initial constant value, and p(X) corresponds to a dementia risk probability value)

The prediction model 130 configured based on Equation 1 may output a dementia risk probability value and output state information obtained by evaluating a condition of the patient based on the dementia risk probability value. The dementia risk probability value refers to the probability of being diagnosed with dementia, the state information is a diagnosis of the patient according to a diagnosis criterion of a specialist, and the state of the patient may be determined as Alzheimer's disease or normal cognitive function. For example, the prediction model 130 may determine the state of the patient as Alzheimer's disease in a case in which the calculated dementia risk probability value is 0.5 or greater, and determine the state of the patient as normal cognitive function in a case in which the calculated dementia risk probability value is less than 0.5.

The method of predicting Alzheimer's disease based on voice characteristics according to the embodiments may be implemented as an application or in the form of program instructions that may be executed through various computer components, and then recorded on a computer-readable recording medium. The computer-readable medium may include program instructions, data files, data structures, or the like separately or in combinations.

Examples of computer-readable recording media include a magnetic medium, such as a hard disk, a floppy disk, or a magnetic tape, an optical recording medium, such as a compact disc read-only memory (CD-ROM) or a digital video disc (DVD), a magneto-optical medium, such as a floptical disk, and a hardware device specially configured to store and execute program instructions, such as ROM, random-access memory (RAM), or flash memory.

Examples of program instructions include not only machine code, such as code made by a compiler, but also high-level language code that is executable by a computer by using an interpreter or the like. The hardware device may be configured to act as one or more software modules to perform the processing according to the present disclosure and vice versa.

The present disclosure has been described with reference to the preferred embodiments. It will be understood by those of skill in the art that the present disclosure may be implemented in a modified form without departing from the intrinsic characteristics of the present disclosure. Therefore, the disclosed embodiments are to be considered in a descriptive sense only, and not for purposes of limitation. The scope of the present disclosure is in the claims rather than the above descriptions, and all differences within the equivalent scope should be construed as being included in the present disclosure.

Experimental Example

The prediction model of the method and device for predicting Alzheimer's disease based on voice characteristics according to the above-described embodiments was constructed, and an experiment was performed to verify the constructed prediction model.

For subject data for constructing the prediction model, voice and diagnostic information was obtained from a total of 210 patients including those who were visiting Boramae Medical Center and those who were registered in Seoul Metropolitan Center for Dementia. The subjects included 106 people in an Alzheimer's dementia group and 104 people in a normal group. In order to collect a voice of the subject, a voice was collected during an interaction between an examiner and the subject.

In order to quantify the voice of the subject, preprocessing was first performed on a voice sample by using an artificial neural network model (a convolutional neural network). That is, in a case in which there are a plurality of input voice samples, preprocessing for selecting human voice samples was first performed to prevent noise data from being input for training. Voice characteristics of the voices were extracted by using an automated voice characteristic extraction method on the preprocessed voices. Voice characteristics, such as fundamental frequency (f0) mean (f0 std) of the voices, information related to speech (e.g., speech rate, speech time, or speech length), pause-related information (e.g., pause rate, pause count, pause duration mean, pause duration standard deviation (std)), shimmer, jitter, formant, harmonic-to-noise ratio, loudness, spectral values (e.g., spectral centroid mean or spectral centroid std), were extracted.

A prediction model for predicting Alzheimer's dementia was configured to receive, as input values, demographic information (e.g., age, gender, years of education) and each extracted voice characteristic, output a dementia risk probability value of the subject, and output state information obtained by evaluating a condition of a patient based on the dementia risk probability value. The prediction model was implemented as a multivariate logistic regression model, and configured to output a dementia risk probability value. The prediction model may determine the state of the patient as Alzheimer's disease in a case in which the calculated dementia risk probability value is 0.5 or greater, and determine the state of the patient as normal cognitive function in a case in which the calculated dementia risk probability value is less than 0.5.

Figure 4:
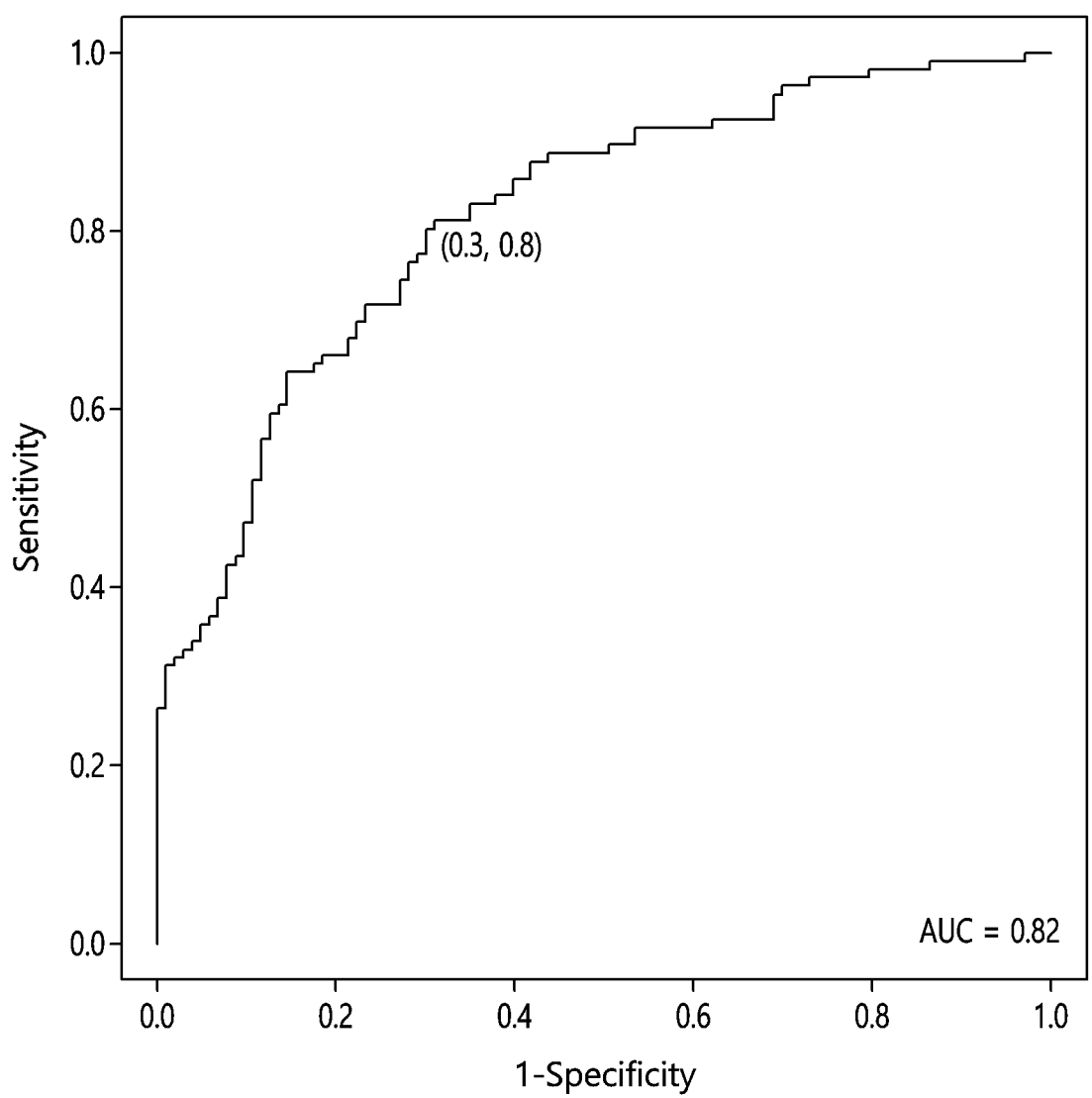
FIG. 4 is a graph showing a result of predicting Alzheimer's disease considering demographic and voice characteristics.

Predictive performance was tested through the configured prediction model. In detail, for the prediction model, an area under the curve (AUC) of an index loader receiver operating characteristic (ROC) curve of the predictive performance was calculated. The AUC is a value obtained by calculating the area under the ROC curve, and is a representative index indicating the overall performance of the prediction model, and the closer the value is to 1, the better the performance. FIG. 4 is a graph showing a result of the configured prediction model, and the performance according to the optimal cutoff score according to Youden Index is shown in Table 1 below.

TABLE 1

| Cutoff | AUC | AUC.se | Sensitivity | Specificity | PPV | NPV |
|---|---|---|---|---|---|---|
| 0.437 | 0.816 | 0.029 | 0.802 | 0.699 | 0.733 | 0.774 |

The predictive power was AUC=0.816, the sensitivity was 0.802, and the specificity was 0.699. The positive predictive value (PPV) was 0.733 and the negative predictive value (NPV) was 0.774.

In the related art, as tests for diagnosing Alzheimer's disease, methods using positron emission tomography (PET) for cerebral amyloid deposition and a cerebrospinal fluid test were used. The use of amyloid PET is expensive, difficult to use except in hospitals that operate specialized medical centers, such as tertiary hospitals, and has risk factors, such as exposure to radiation. Regarding cerebrospinal fluid analysis, there are limitations, such as the use of invasive lumbar puncture, labor required for work and analysis, and differences in reliability depending on institutions.

On the contrary, the method and device for predicting Alzheimer's disease based on voice characteristics according to the present disclosure is to diagnose Alzheimer's disease through a test using a non-invasive method, is to perform a psychological screening test without the limitations of time, space, and expertise, and allows the test to be comfortably performed through an AI speaker, a smart phone, a tablet, a personal computer (PC), or the like, at home or in any place other than a hospital. In addition, the method and device enable determination of the risk of Alzheimer's disease at primary and secondary clinics, minimize false-positives to reduce costs, and may be expanded to future treatment programs.

That is, considering that cerebrospinal fluid examination or PET, which are used to accurately diagnose Alzheimer's disease that is a representative dementia-causing disease, is limited to a particular space and time with an expert, the method of predicting the presence or absence of Alzheimer's disease in a participant in a conversation by using an AI speaker and a smart device according to the present disclosure is expected to help overcome the temporal, spatial, and resource limitations associated with existing tests.

As a result, the diagnosis of Alzheimer's disease risk using the acoustic characteristics of a voice is expected to provide an appropriate intervention plan for the continuously increasing population with dementia.

The invention claimed is:

1. A device for predicting Alzheimer's disease, the device comprising:
a voice input unit configured to generate a voice sample by recording a voice of a subject;
a data input unit configured to receive demographic information of the subject;
a voice characteristic extraction unit configured to extract voice characteristics from the generated voice sample; and
a prediction model that is pre-trained to predict presence or absence of Alzheimer's disease in the subject, based on the voice characteristics and the demographic information,
wherein the prediction model comprises a multivariate logistic regression model that comprises at least one term determined by a combination of a plurality of first independent variables representing the voice characteristics, a plurality of second independent variables representing the demographic information, and a plurality of regression coefficients,
wherein the plurality of regression coefficients are trained to determine a decision boundary of the multivariate logistic regression model, and
wherein the multivariate logistic regression model is configured to output a dementia risk. probability value according to the plurality of first independent variables and the plurality of second independent variables using the decision boundary, and output state information that is determined as Alzheimer's disease or normal cognitive function based on the dementia risk probability value.

2. The device of claim 1, wherein the demographic information comprises age, gender, and years of education of the subject.

3. The device of claim 1, wherein the voice characteristic extraction unit is further configured to extract, as the voice characteristics, at least one of a fundamental frequency, a speech rate, a speech time, a speech length, a pause degree, a number of pauses, a pause interval length, a shimmer, a jitter, a formant, a harmonic-to-noise ratio, a loudness, a spectral centroid, Mel-frequency cepstral coefficients (MFCCs), an identity vector (i-vector), an articulation rate, a zero-crossing rate (ZCR), a voicing probability (VP), line spectral pairs (LSP), a period perturbation, an amplitude perturbation quotient (APQ), stiffness, energy, an intensity (volume), and an entropy of a voice.

4. The device of claim 3, wherein the voice characteristic extraction unit comprises an artificial neural network model configured to perform preprocessing to select a human voice from the voice sample, and
the voice characteristic extraction unit is further configured to extract the voice characteristics from a preprocessed voice sample.

5. The device of claim 1, wherein the prediction model further comprises at least one analysis model among a linear regression model, a machine learning model, and a neural network model.

6. The device of claim 5, wherein
the multivariate logistic regression model is configured based on Equation 1:

$$\log\left(\frac{p(X)}{1-p(X)}\right) = \beta_0 + \beta_1 X_1 + \beta_2 X_2 + \beta_3 X_3 + \ldots + \beta_p X_p \quad \text{[Equation 1]}$$

wherein, $X_1$ to $X_p$ are independent variables that are input values input to the prediction model and correspond to p voice characteristics and pieces of the demographic information, respectively, $\beta_1$ to $\beta_p$ correspond to constant values that are regression coefficients of the independent variables, $\beta_0$ corresponds to an initial constant value, and $p(X)$ corresponds to the dementia risk probability value.

7. A method of predicting Alzheimer's disease based on voice characteristics, the method comprising:
  generating a voice sample by recording a voice of a subject;
  receiving demographic information of the subject;
  extracting voice characteristics from the generated voice sample; and
  predicting presence or absence of Alzheimer's disease in the subject by inputting the voice characteristics and the demographic information into a pre-trained prediction model,
  wherein the prediction model comprises a multivariate logistic regression model that comprises at least one term determined by a combination of a plurality of first independent variables representing the voice characteristics, a plurality of second independent variables representing the demographic information, and a plurality of regression coefficients,
  wherein the plurality of regression coefficients are trained to determine a decision boundary of the multivariate logistic regression model, and
  wherein the multivariate logistic regression model is configured to output a dementia risk probability value according to the plurality of first independent variables and the plurality of second independent variables using the decision boundary, and output state information that is determined as Alzheimer's disease or normal cognitive function based on the dementia risk probability value.

8. A computer-readable recording medium having recorded thereon computer-readable instructions, the computer-readable instructions, when executed by at least one processor, causing the at least one processor to:
  generate a voice sample by recording a voice of a subject;
  receive demographic information of the subject;
  extract voice characteristics from the generated voice sample; and
  predict presence or absence of Alzheimer's disease in the subject by inputting the voice characteristics and the demographic information into a pre-trained prediction model,
  wherein the prediction model comprises a multivariate logistic regression model that comprises at least one term determined by a combination of a plurality of first independent variables representing the voice characteristics, a plurality of second independent variables representing the demographic information, and a plurality of regression coefficients,
  wherein the plurality of regression coefficients are trained to determine a decision boundary of the multivariate logistic regression model, and
  wherein the multivariate logistic regression model is configured to output a dementia risk probability value according to the plurality of first independent variables and the plurality of second independent variables using the decision boundary, and output state information that determined as Alzheimer's disease or normal cognitive function based on the dementia risk probability value.

* * * * *